United States Patent [19]

Toshifumi

[11] Patent Number: 4,922,767
[45] Date of Patent: May 8, 1990

[54] HELICAL GEAR TRANSMISSION DEVICE

[75] Inventor: Ito Toshifumi, Saitama, Japan

[73] Assignee: Honda Giken Kogyo Kabushiki Kaisha, Tokyo, Japan

[21] Appl. No.: 104,996

[22] Filed: Oct. 6, 1987

[30] Foreign Application Priority Data

Oct. 8, 1986 [JP] Japan .................. 61-238103

[51] Int. Cl.$^5$ .............................................. F16H 3/08
[52] U.S. Cl. .................................. 74/333; 74/421 R; 74/458
[58] Field of Search ............ 74/323, 324, 333, 421 R, 74/424.5, 458

[56] References Cited

U.S. PATENT DOCUMENTS

| | | | |
|---|---|---|---|
| 1,899,685 | 2/1933 | Hanson | 74/333 X |
| 2,057,073 | 10/1936 | Vandervoort | 74/333 |
| 2,284,233 | 5/1942 | Schotz | 74/333 |
| 2,306,545 | 12/1942 | Kammich | 74/333 X |
| 2,342,949 | 2/1944 | Lootbourrow | 74/333 |
| 2,449,964 | 9/1948 | Banker | 74/333 X |
| 2,753,725 | 7/1956 | De Vlieg | 74/333 |
| 3,046,807 | 7/1962 | Barth et al. | 74/333 X |
| 3,088,336 | 5/1963 | Fodrea | 74/333 X |
| 3,885,446 | 5/1975 | Pengilly | 74/333 X |

FOREIGN PATENT DOCUMENTS

| | | | |
|---|---|---|---|
| 990451 | 9/1951 | France | 74/333 |
| 502033 | 11/1954 | Italy | 74/333 |
| 415891 | 9/1934 | United Kingdom | 74/333 |

OTHER PUBLICATIONS

"Spiral and Worm Gearing", by the Machinery Publishing Co., Sep. 1914, pp. 30 and 31.

*Primary Examiner*—Dwight G. Diehl
*Attorney, Agent, or Firm*—Lyon & Lyon

[57] ABSTRACT

A method and apparatus is disclosed for arranging gears of a helical gear transmission in order to reduce the degree of thrust and, thereby, the wear occurring between those gears of such transmission and the clutch associated therewith for selectably connecting the associated gear for rotation on the gear shaft.

1 Claim, 3 Drawing Sheets

HELICAL GEAR TRANSMISSION DEVICE

BACKGROUND OF THE INVENTION

The present invention relates to gear transmissions, and, more particularly, to improvements in multiple stage transmission devices having helical gearing and capable of use in the power transmissions of motorcycles, or the like.

In the prior art there are known transmission devices for four wheel vehicles in which helical gearing is used to smoothly and silently transmit rotation to a driven shaft. In such devices plural sets of gear pairs are always provided in which to mesh a fixed gear on one shaft with a loose, rotating gear on the other shaft, whereby the loose, rotating gear of an optional set can be alternately coupled to the shaft by a synchronized clutch. On the other hand, a transmission device for a motorcycle is known in which a spur gear is used as a transmission gear and a loose, rotating gear is coupled to a shaft by a meshing clutch in which the clutch is shifted by a shift fork.

While the above-mentioned transmission device for four wheel vehicles has an advantage in that the transmission is smooth and silent because of the use of helical gearing, it has the disadvantage that the synchronized clutch necessary for its use is complicated. On the other hand, while the above described transmission device for a motorcycle, because of use of a spur gear, has a tendency toward noisy operation, it has the advantage that its clutch mechanism is simple. When the advantages of both of these transmission devices are sought to be combined, a structure such as that shown in FIG. 2 results. Use of this structure, however, results in wear in the contact portions of the clutch, particularly with clutches employing a shift fork.

The present invention is intended to ameliorate this problem and to provide a transmission device which is structurally simple, yet durable.

SUMMARY OF THE INVENTION

Accordingly, prior to describing the present invention, the device of FIG. 2 will be explained. In FIG. 2, helical gears $b_1$, $b_2$, $b_3$, $b_4$ are formed integrally on a driving shaft a on which one loose rotating gear c and a meshing clutch d, that engages and disengages the gear c to the driving shaft a, are provided. The clutch d is adapted to rotate together with the driving shaft a through the intermediary of a collar e having spline grooves on its inner and outer peripheries. The collar e is also adapted to prevent a displacement of the loose rotating gear c in an axial direction along shaft a. Meshing clutches $i_1$, $i_2$ are selectively engageable with the loose, rotating gears $g_1$ and $g_2$. Clutches $i_3$ and $i_4$ similarly engage gears $g_3$ and $g_4$.

The driven shaft f is provided with the loose rotating gears $g_1$ to $g_4$ and a fixed gear h that mesh with each of the respective helical gears on the driving shaft a. Between the inner periphery of each of the clutches and the driven shaft f are interposed collars $j_1$, $j_2$ similar to the collar e, and in the peripheral annular groove of each of the collars $j_1$, $j_2$ and e are engaged shift forks $k_1$, $k_2$ and $k_3$. In such a device, the gears $b_1$ to $b_4$ integral with the driving shaft a are designed to employ helical teeth normally having an inclination in the same direction; for example, the same slant as a right handed thread. The loose, rotating gear c, will have a slant in an opposite direction, such as for example, the same slant as a left handed thread. In FIG. 2, legends "RH" indicate helical teeth having a spiral angle of a right handed thread and legends "LH" indicate helical teeth having a spiral angle of a left handed thread.

In the above device, when the driving shaft a is driven in the direction shown by arrow A, a clockwise revolution as seen from the right end, the driven shaft f effects a counterclockwise rotation as shown by the arrow B through the intermediary of the gears. Considering the relationship of the forces acting on each portion of the set of gears c and h at the right end of the respective shafts, when the shaft a is undergoing a clockwise rotation as shown in FIG. 3, since the gear c has a tooth of left handed slant LH, it receives a force of direction D by a load counterforce and is caused to incline as indicated by the phantom line c'. The gear h receives a force of a direction E and inclines as indicated by the phantom line h'.

Simultaneously, the gear c receives a counterforce along a line of action, as shown in FIG. 4 by arrow F, and is displaced in the direction of the arrow F to become eccentric to the shaft a. A pawl of the gear c and a pawl of the clutch d strongly contact with each other in a range, indicated as G. When the pawls are out of this range, the contact pressure weakens due to clearance considerations. Accordingly, when the pawls enter into the range G, the contact pressure between engaging pawls increases. Consequently, because of the inclination in the direction D of the gear c, a thrust H results from the clutch d and the shift fork $k_3$ is pressed by the clutch d due to the thrust H.

Also, as shown in FIG. 5, since, due to the fact that torque is transmitted, the contact surfaces between the clutch d and the gear c are slightly inclined and an axial component of force M of a transmitting counterforce L is produced. Because the component of force M and the thrust H are in the same direction, the clutch d is pushed by a force of H+M and rotates while pressing the shift fork $k_3$. Because the latter is held at a determined position by a shift drum, a condition of wear occurs in a contact portion K of the clutch d and the shift fork $k_3$ by this pressing. If the gear c is changed into one having helical teeth RH of the right handed thread, the arrows D, E and H in FIG. 3 are reversed, and the thrust H is exerted in a direction opposite the counter force M whereby the wear of the contact surface between the clutch d and the shift fork is reduced.

Accordingly, for the driving shaft a, the direction of inclination of the helical teeth of the loose, rotating gear c is to be identical to that of the inclination of the thread of a screw rotating and advancing in the same direction on the same axis as the driving shaft a.

Next, consideration is given to the driven shaft f. As shown in FIG. 6, the driven shaft f rotates in the counterclockwise direction by the clockwise rotation A of the driving shaft a, whereby each of the loose, rotating gears $g_1$ to $g_4$ inclines and thrusts P, both being in the same direction, are exerted. The thrusts P act in a direction to bear heavily on the shift fork for the clutch $i_1$ and $i_3$ and in a direction reducing the bearing pressure against the shift fork for the clutches $i_2$ and $i_4$.

Thus, if the helical angle of the gears $b_1$ and $b_3$ is LH and the helical angle of the gears $g_1$ and $g_3$ is RH, the thrust P of the gears $g_1$ and $g_3$ becomes reversed and the gears $g_1$ and $g_3$ incline in a direction slipping away from the clutches $i_1$ and $i_3$, whereby the contact pressure against the shift fork will be reduced.

As viewed from the side of clutch $i_1$ or $i_3$, providing the gears $g_1$ and $g_3$ with a RH helical angle, such as the slant of the threads of a screw which rotates in the direction B and moves toward the right in FIG. 6. As to the gears $g_2$ and $g_4$, their direction of inclination is to be the same as that shown in FIG. 6.

The rotating direction B of the driven shaft f is clockwise when viewed from the side of the clutch $i_2$ or $i_4$. Therefore, the gears $g_2$ and $g_4$ are to be provided with a LH helical angle.

Accordingly, as regards the driven shaft, the slant of the helical teeth of the loose rotating gear is to be identical to the slant of threads on a screw which, when rotating coincidentally with the direction of rotation of the driven shaft, moves coaxially and backwardly (i.e., toward the clutch) on the driven shaft.

Therefore, the slant of the helical teeth of the loose rotating gear on the driven shaft is to be reverse to the slant of the helical teeth of the loose rotating gear on the driving shaft.

Or, stated another way, it will be appreciated that the bearing pressure produced by the thrust force, and thereby the wear occurring between the gear-engaging clutch and the shift fork can be reduced by providing the loose, rotating gear, which is engaged by the clutch, if on the driving shaft, with gear teeth having a helix angle inclined so as to tend to move the gear axially away from the clutch and, if on the driven shaft, with gear teeth having a helix angle inclined so as to tend to move the gear axially toward the clutch.

For a better understanding of the invention, its operating advantages and the specific objectives obtained by its use, reference should be made to the accompanying drawings and description which relate to a preferred embodiment thereof.

DESCRIPTION OF A PREFERRED EMBODIMENT OF THE INVENTION

Figure 1:
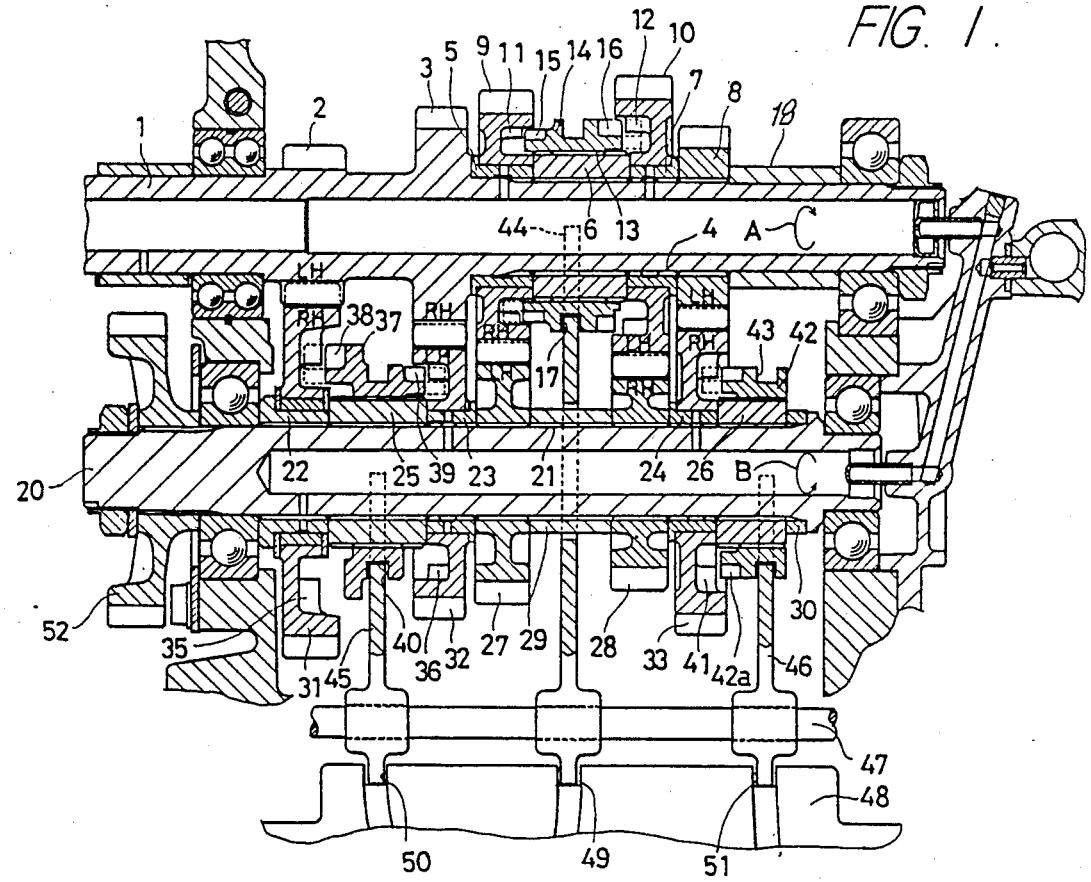
FIG. 1 is a sectional view showing a five stage transmission device according to the present invention.
Figure 2:
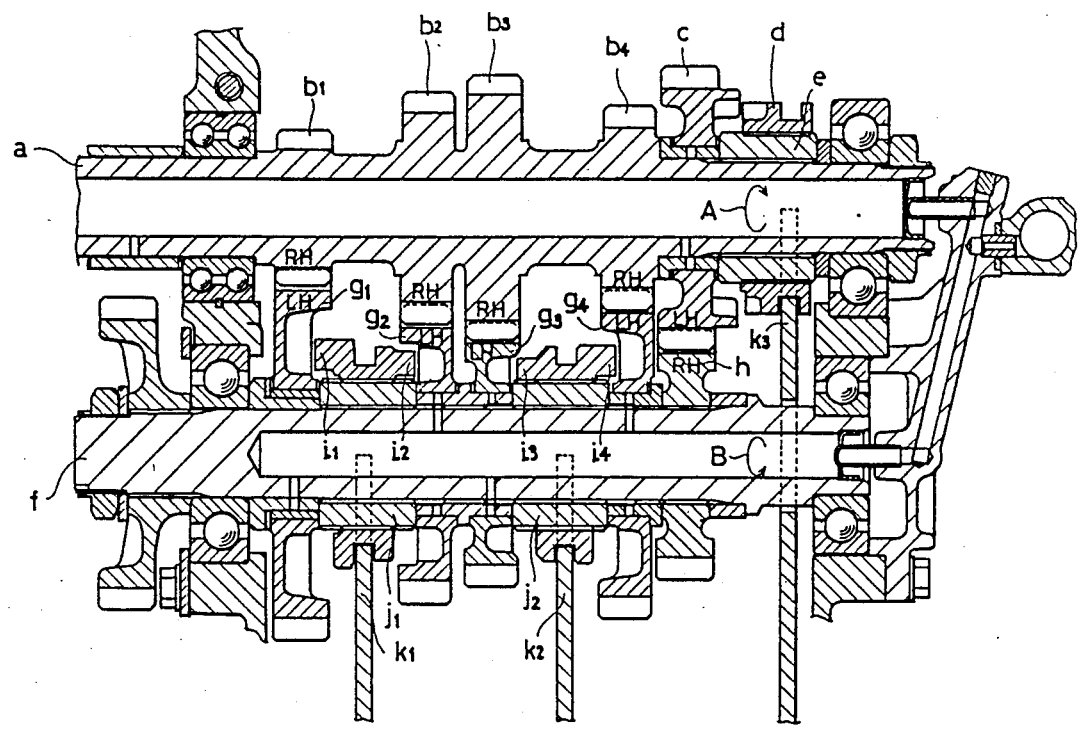
FIG. 2 is a sectional view showing a prior art five stage transmission device.
Figure 3:
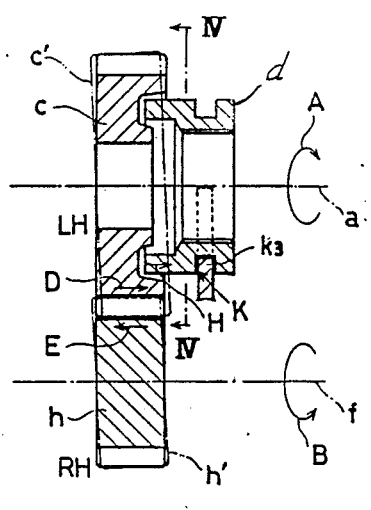
FIG. 3 is a partial view of the device of FIG. 2.
Figure 4:
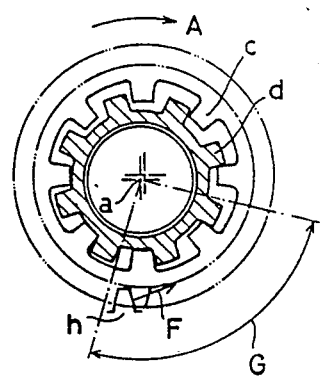
FIG. 4 is a view taken along line IV—IV of FIG. 3.
Figure 5:
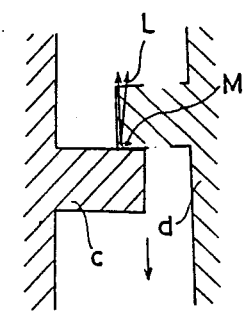
FIG. 5 is a schematic view explaining the thrust loading of a meshing clutch.
Figure 6:
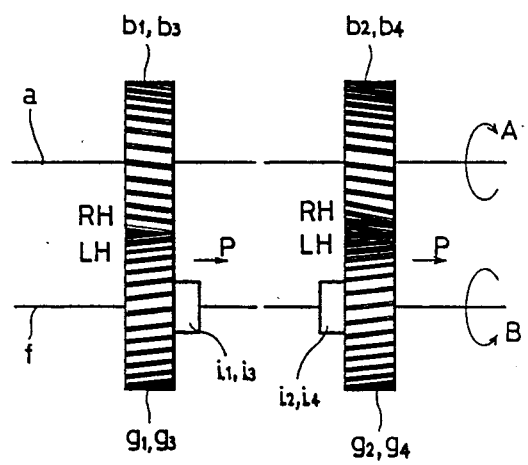
FIG. 6 is a schematic view explaining actions of a loose, rotating gear and a clutch of a driven shaft side of the device in FIG. 2.

FIG. 1 shows a transmission device based on the above described features. In the transmission device of FIG. 1, on a driving shaft 1 are integrally provided a first speed gear 2, a third speed gear 3 and a spline 4. On spline 4 are fitted a gear collar 5, a spline collar 6, a gear collar 7 and a second speed gear 8. On the gear collars 5 and 7 are fitted a fourth speed gear 9 and a fifth speed gear 10, respectively as loose, rotating gears. On opposing surfaces of both loose, rotating gears 9 and 10 are provided clutch pawls 11 and 12. On the outer periphery of the spline collar 6 is provided a spline 13 with which a two way clutch 14 is slidably coupled. Clutch pawls 15 and 16 on opposite sides of the clutch 14 engage with, and disengage from, the clutch pawls 11 and 12 to couple the gears 9 and 10 selectively to the driving shaft 1. On the outer periphery of the clutch 14 is provided a ring groove 17 which is adapted to engage a shift fork 44 described hereinafter. Axial displacement of the members from the gear collar 5 to the gear 8 coupled on the spline 4 is prevented by a shaft collar 18.

On the driven shaft 20 is provided a long spline 21 to which gear collars 22, 23, 24, spline collars 25, 26 and fixed gears 27, 28 are spline-coupled and positioned by means of shaft collars 29, 30. On each of the gear collars 22, 23, 24 are rotatably fitted loose, rotating gears 31, 32, 33. Opposing surfaces of the gears 31, 32 are formed with clutch pawls 35, 36. Clutch pawls 38, 39 on a clutch 37, which is spline-coupled to the spline collar 25, are adapted to engage in, and disengage from, the clutch pawls 35, 36. Also, a ring groove 40 is provided on an outer periphery of the clutch 37. On the right end surface of the loose rotating gear 33 is formed a clutch pawl 41, and on the clutch 42, spline-coupled to the spline collar 26, are provided a clutch pawl 42a and a ring groove 43, so as to engage with, and disengage from, the intermeshing of a clutch pawls 41, 42a.

Into the ring grooves 17, 40, 43 of each of the clutches engage respectively shift forks 44, 45, 46 which are fitted into and guided by a guide bar 47. Rear ends of each of the shift forks 44, 45, 46 are fitted into a cam groove 49, 50, 51 on the shift drum 48. By rotating the shift drum 48, any one of the loose rotating gears can be clutch-coupled to the driving shaft 1. The clockwise rotation A of the driving shaft 1 is transmitted to the driven shaft 20 by the clutch-coupled loose, rotating gear with a fixed gear whereby output gear 52 is driven in counterclockwise rotation B.

The helix angle of each gear has the angle of right handed thread or a left handed thread as shown by the designations, "RH" or "LH". Since the loose, rotating gear 9 has the slant RH of right handed thread, it is subjected to a thrust in a direction away from the clutch 14 by the clockwise rotation A seen from the clutch 14 side. Since the loose, rotating gear 10 has the slant LH of a left handed thread, it causes a thrust in the right direction, that is, a direction away from the clutch 14 by the clockwise rotation A. When viewing this loose, rotating gear from the clutch 14, it has a counterclockwise rotation.

Accordingly, with reference to the driving shaft, when viewed from the clutch side, if the teeth on the loose rotating gear on the shaft have a slant identical to the slant of threads of a screw that rotates coincident with the direction of rotation of the driving shaft and moves coaxially and forwardly on the shaft, no thrust occurs between the loose rotating gear and the clutch.

Or, stated another way, if the loose, rotating gears on the driving shaft are provided with helical teeth for imposing a torsion force comparable in direction to the thread of a screw that moves away from the clutch, the gears on the driving shaft will impose no thrust force against their associated clutch.

Next, in respect to gears on the driven shaft 20, because the loose, rotating gears 31, 33 have the slant RH of a right handed thread and are driven in the direction B of counterclockwise rotation, each is subject to a thrust force directed toward the left in a direction away from the associated clutch 37, 42, whereby the thrust is not imposed on the clutches. The loose, rotating gear 32, since it is the slant LH of the left handed thread, is subject to a thrust force directed toward the right by the counterclockwise rotation B whereby the thrust does not occur in the direction of the clutch 37. When seen from the clutch 37 side, the direction of rotation B is a clockwise rotation which is reverse to that viewed from the loose rotating gear 32.

Accordingly, if the loose, rotating gears on the driven shaft 20 are provided with helical teeth having a helix angle similar to threads on a screw which, if rotated in the same direction as the direction of rotation of the driven shaft seen from the clutch, the loose, rotating gear is not urged to the clutch side, such that the occurrence of a thrust force between the two members can be prevented.

It will be appreciated that, according to the present invention, the slant direction of the helical teeth on the gear can be specified according to the positions of the respective helical gears and their meshing clutches whereby no thrust forces will be imposed on the respective clutches. Accordingly, since the invention makes it possible to reduce friction in the contact portions between the ring grooves of the clutches and their shift forks, friction noise and wear, or the like, are reduced and the need of antifriction materials in the contact portions is avoided.

Although a preferred embodiment of the invention has been shown and described, it should be understood that various changes can be made therein without departing from the scope of the appended claims.

I claim:

1. A helical gear transmission including a rotatable driving shaft and rotatable driven shaft, two pairs of drive and driven gears provided side-by-side on each of said shafts including a pair of fixed gears on one of said shafts and a pair of loose, rotatable gears on the other of said shafts meshing with said fixed gears and a clutch on said other shaft axially selectively movable by a shift fork between said loose, rotatable gears to fix one or the other thereof to said other shaft, characterized in that said pairs of drive and driven gears have helical gear teeth having oppositely directed inclinations of the helix angle and operative to develop a thrust force in a direction opposite to the direction of the axial component of the counterforce transmitted between the respective loose, rotatable gears and the clutch in that said loose, rotatable gears, if disposed on said driving shaft are provided with teeth having a helix angle inclined in a direction to move said loose, rotatable gears axially away from said clutch, or, if disposed on said driven shaft, are provided with teeth having a helix angle inclined in a direction to move said loose, rotatable gear axially toward said clutch.

* * * * *